(12) United States Patent
Mendis et al.

(10) Patent No.: US 12,489,217 B2
(45) Date of Patent: Dec. 2, 2025

(54) ARTIFICIAL DIELECTRIC ISOLATOR FOR THz RADIATION

(71) Applicant: Brown University, Providence, RI (US)

(72) Inventors: Rajind Mendis, Providence, RI (US); Masaya Nagai, Osaka (JP); Daniel M. Mittleman, Providence, RI (US)

(73) Assignee: BROWN UNIVERSITY, Providence, RI (US)

( * ) Notice: Subject to any disclaimer, the term of this patent is extended or adjusted under 35 U.S.C. 154(b) by 364 days.

(21) Appl. No.: 18/335,049

(22) Filed: Jun. 14, 2023

(65) Prior Publication Data
US 2023/0361478 A1 Nov. 9, 2023

Related U.S. Application Data

(62) Division of application No. 16/494,221, filed as application No. PCT/US2018/022158 on Mar. 13, 2018, now Pat. No. 11,705,639.
(Continued)

(51) Int. Cl.
*H01Q 15/24* (2006.01)
*G02B 5/30* (2006.01)
*G02B 27/28* (2006.01)

(52) U.S. Cl.
CPC ......... *H01Q 15/242* (2013.01); *G02B 5/3008* (2013.01); *G02B 5/3058* (2013.01); *G02B 27/285* (2013.01)

(58) Field of Classification Search
CPC .. H01Q 15/242; G02B 5/3008; G02B 5/3058; G02B 27/285; G02B 27/283
See application file for complete search history.

(56) References Cited

U.S. PATENT DOCUMENTS

| | | |
|---|---|---|
| 5,844,682 A | 12/1998 | Kiyomoto et al. |
| 2002/0179912 A1 | 12/2002 | Batchko et al. |

(Continued)

OTHER PUBLICATIONS

Mendis, et al., "Artificial dielectric polarizing-beamsplitter and isolator for the terahertz region", Scientific Reports, vol. 7, No. 5909, Jul. 19, 2017, 9 pages.
(Continued)

*Primary Examiner* — Charles S Chang
(74) *Attorney, Agent, or Firm* — K&L Gates LLP

(57) ABSTRACT

An isolator based on a waveguide-based artificial dielectric medium is scalable to a range of desired terahertz frequencies, has non-reciprocal transmission and provides low insertion loss and high isolation at various tunable terahertz frequencies, far exceeding the performance of other terahertz isolators, and rivaling that of commercial optical isolators based on the Faraday effect. Because terahertz artificial dielectrics are low loss, inexpensive, and easy to fabricate, this approach offers a promising new route for polarization control of free-space terahertz beams in various instrumentation applications. Artificial dielectrics are man-made media that mimic properties of naturally occurring dielectric media, or even manifest properties that cannot generally occur in nature. A simple and effective strategy implements a polarizing-beam-splitter and a quarter wave plate to form a highly effective isolator. Performance of the device is believed to exceed that of any other experimentally demonstrated method for isolation of back-reflections for terahertz beams.

5 Claims, 8 Drawing Sheets

Related U.S. Application Data

(60) Provisional application No. 62/474,301, filed on Mar. 21, 2017, provisional application No. 62/470,685, filed on Mar. 13, 2017.

(56) References Cited

U.S. PATENT DOCUMENTS

| | | |
|---|---|---|
| 2006/0203324 A1 | 9/2006 | Harris et al. |
| 2007/0296032 A1 | 12/2007 | Stumbo et al. |
| 2010/0142047 A1 | 6/2010 | Fujii et al. |
| 2013/0070326 A1 | 3/2013 | Frisken et al. |
| 2015/0116721 A1 | 4/2015 | Kats et al. |
| 2015/0205079 A1* | 7/2015 | Takayanagi ........ G01N 21/3581 359/350 |
| 2016/0077261 A1 | 3/2016 | Arbabi et al. |

OTHER PUBLICATIONS

Mendis, et al., "Terahertz Artificial Dielectric Lens", Scientific Reports, 6, 2No. 23023, Mar. 14, 2016, 8 pages.

International Search Report and Written Opinion received for PCT Patent Application No. PCT/US2018/022158, mailed on May 15, 2018, 7 pages.

\* cited by examiner

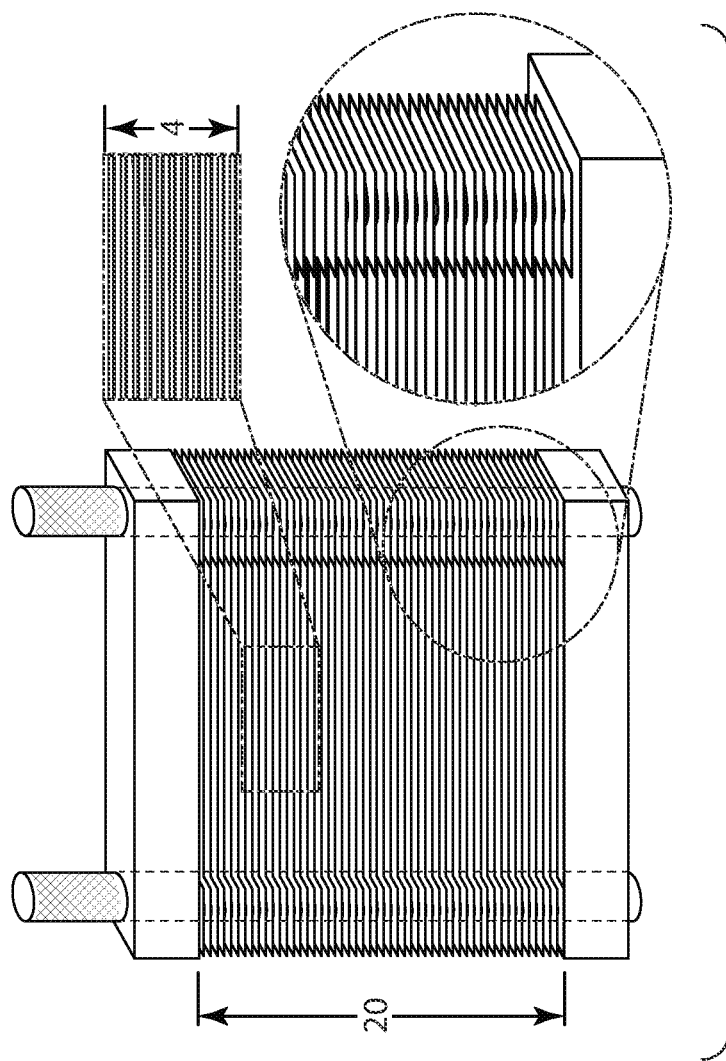
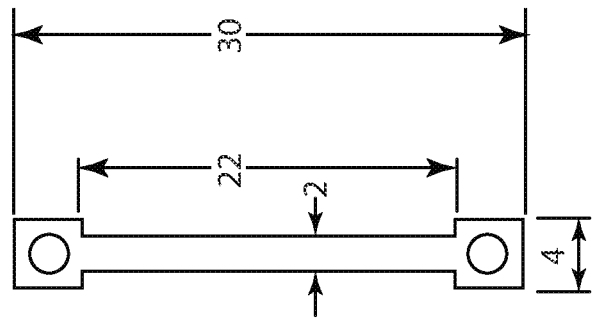
Figure 1(A)
Figure 1(B)

L: Lens
M: Mirror
A: Aperture
P: Polarizer
QWP: Quarter Wave Plate
SBS: Silicon Beam Splitter
PBS: Polarizing Beam Splitter

ARTIFICIAL DIELECTRIC ISOLATOR FOR THz RADIATION

CROSS-REFERENCE TO RELATED APPLICATIONS

This application is a divisional of U.S. National phase application Ser. No. 16/494,221 filed Sep. 13, 2019, which is a national phase filing under 35 U.S.C. § 371 of International Application No. PCT/US/2018/022158 filed Mar. 13, 2018, which claims priority to U.S. Provisional Patent Application No. 62/470,685 filed Mar. 13, 2017, and U.S. Provisional Patent Application No. 62/474,301 filed Mar. 21, 2017, the entire contents of which are hereby incorporated by reference herein.

GOVERNMENT SUPPORT

This invention was made with government support under grant 1609521 awarded by the National Science Foundation. The government has certain rights in the invention.

This application is addressed to an isolator construction based on artificial dielectric materials for operation in the terahertz spectral regime. Applicants hereby incorporate by reference herein in its entirety the full text, drawings and disclosure of provisional application Ser. No. 62/432,157 filed Dec. 9, 2016 in the U.S. Patent and Trademark Office, as well as the full text, drawings and disclosure of provisional application Ser. No. 62/470,685 filed Mar. 13, 2017 in the U.S. Patent and Trademark Office, and also the full text, drawings and disclosure with its appendix of provisional application Ser. No. 62/474,301 filed Mar. 21, 2017 in the U.S. Patent and Trademark Office, which compactly describe a THz domain isolator construction and a series of measurements evaluating its operation with terahertz signals from a frequency-matched Polarizing Beam Splitter.

BACKGROUND AND DETAILED DESCRIPTION

A polarizing-beam-splitter (PBS) is a device that splits a linearly polarized beam into two orthogonal polarization components, in a pre-determined power ratio. In the THz region, there have been a few studies on PBSs using metamaterials [1], dielectric bi-layers [2], diffraction gratings [3], and recently, using form birefringence [4]. (numbers in square brackets refer to publications listed in the bibliography, infra. In all of these prior art cases, the fabrication of the device is complicated and not readily scalable. Here we present experimental characterization of a PBS involving a far simpler geometry and exhibiting remarkable performance. Our design is based on artificial dielectrics [5, 6], man-made media that mimic properties of naturally occurring dielectric media, or even manifest properties that cannot generally occur in nature. Although originally introduced by the microwave community, the wavelength scaling that result when shifting from microwaves to THz waves gives new life to this waveguide-based technology [7]. At the design frequency of 0.2 THz, our PBS exhibits an extinction ratio of 42 dB in transmission and 28 dB in reflection with an overall insertion loss of 0.18 dB, the best values ever reported in the THz range. Further, by combining our PBS with a quarter-wave-plate based on the same artificial-dielectric technology, we demonstrate a THz isolator with an isolation of 52 dB and an insertion loss less than one dB, at a frequency of 0.46 THz. This isolation is more than three orders of magnitude higher than recently demonstrated THz isolators based on graphene [8], and the insertion loss is considerably lower than previously demonstrated THz isolators based on ferrite materials [9, 10]. In addition, our design does not require an externally applied magnetic field. Indeed, the performance of our device rivals that of commercially available Faraday isolators at optical wavelengths. This simple method for achieving very high isolation will be invaluable for numerous applications involving high-power THz sources [11] or THz systems with highly sensitive receivers [12].

The isolator of the present invention will be described in connection with exemplary embodiments wherein a polarization beam splitter (PBS) provides polarization selectivity in the beam path, and a quarter wave plate (QWP) provides a phase delay, which in combination with the PBS, is used to reject reflections of the beam. The PBS operates with frequencies below cutoff, which depends upon the spacing of metal plates which constitute the artificial dielectric and the incident angle, while the QWP operates above a cutoff frequency that depends upon the plate spacing and introduces a phase delay which depends upon the plate width and the plate spacing. These two elements constructed with artificial dielectric materials result in superior operating characteristics.

BRIEF DESCRIPTION OF THE DRAWINGS

The invention will be understood from the description and drawings herein, taken together with the claims appended hereto, wherein FIGS. 1(A)-1(D) show a polarizing beam splitter (PBS) fabricated with artificial dielectric construction and simulations. Illustrated details include 1(A) Photograph of the PBS device with close-up views showing a square section of the stack-of-plates (looking on axis) and the bottom-corner of the mounting post. 1(B) Geometry of a single stainless-steel plate. (c, d) FEM simulations of the beam propagation at a frequency of 0.2 THz when the input electric field is linearly polarized 1(C) perpendicular, and 1(D) parallel, to the plates. The beam diameter is 1 cm and the angle of incidence is 45°. All dimensions are in millimeters.

DETAILED DESCRIPTION—DESIGN AND FABRICATION

Figure 1D:
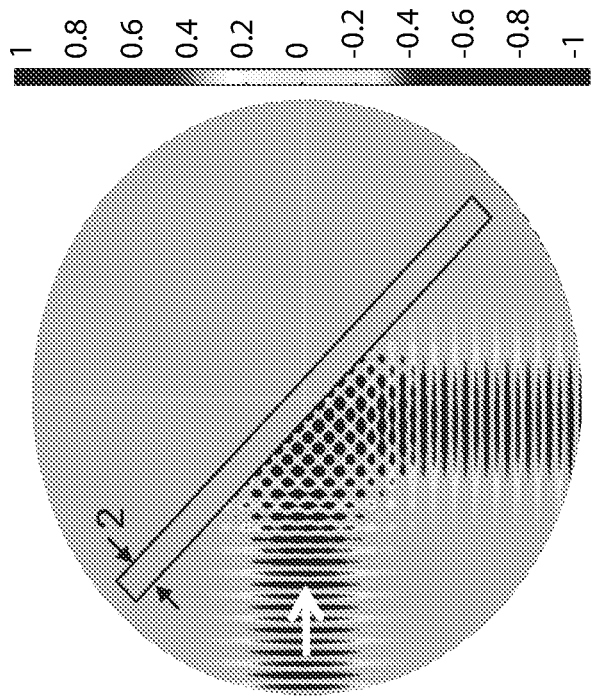

The artificial dielectric medium as employed herein for splitting polarizations consists of a uniform stack of identical, rectangular metal plates. This stack-of-plates is electromagnetically equivalent to a stacked array of parallel-plate waveguides (PPWGs) [7], and in an exemplary embodiment are made of 30 μm thick stainless steel and are spaced 300 μm apart, as seen in the prototype device shown in FIG. 1(A). The plates and the spacers are fabricated by chemical etching to avoid any strain or burring, which helps to maintain their flatness. The device is assembled by stacking the plates and spacers intermittently along two locating posts, such that the plates are free-standing, supported only by their ends. At each end, there is a square pad with a mounting hole as shown in FIG. 1(B), which gives the actual shape of a plate. Once assembled, this stacked-plate arrangement results in a clear aperture of 20 mm. The magnified, close-up view of the 4 mm square section of the clear aperture illustrates the flatness of the plates and the uniformity of their spacing. Taking a slice across this image and using a graphical reconstruction method, we measure an average center-to-center plate spacing of 330 μm, with a standard deviation of 5 μm.

Figure 1C:
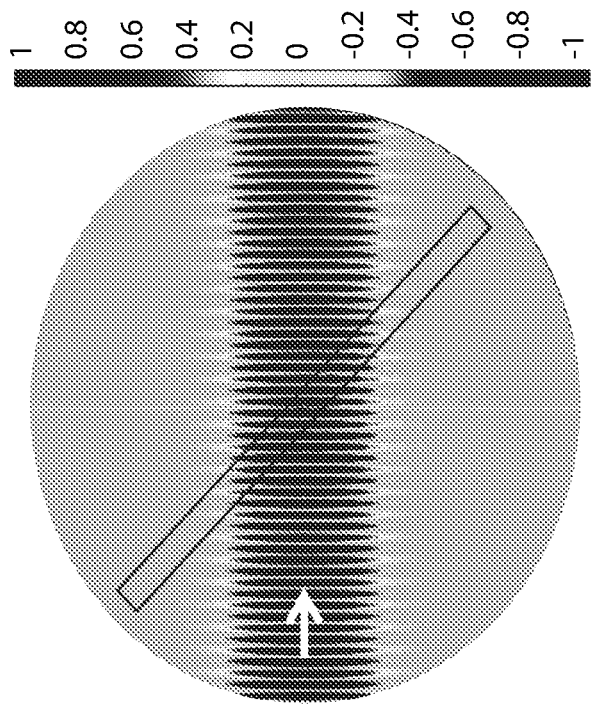

In the designed device geometry, the THz beam is directed at the stack-of-plates at an angle of 45° to the virtual surface emulated by the plate edges, with the plane of incidence parallel to the plate surfaces. The operation of the PBS relies on both the TEM and $TE_1$ fundamental modes of the PPWG [13, 14]. When the input electric-field is linearly polarized perpendicular to the plates, only TEM modes are excited in the PPWG array, and the beam propagates through the device without altering its path. This behavior is illustrated in the FEM simulation result shown in FIG. 1(C), which plots the instantaneous electric field of the propagating beam along the axial cross-section parallel to the plate surfaces, at a frequency of 0.2 THz. As long as the input beam diameter is sufficiently larger than the plate spacing (for proper mode-matching) and the interaction path-length is short, this TEM-mode propagation will be a very efficient (i.e., low loss) process [13]. On the other hand, when the input electric-field is linearly polarized parallel to the plates, only $TE_1$ modes can be excited in the PPWG array, and the propagation is governed by the mode's cutoff frequency. Input frequencies that are above the cutoff will propagate through the device, while those that are below the cutoff will be reflected. In fact, these below-cutoff frequencies will be totally and specularly reflected in a well-defined beam [7]. This behavior is illustrated in the FEM simulation result shown in FIG. 1(D), which plots the instantaneous magnetic field of the propagating beam at a frequency of 0.2 THz.

Figure 2:
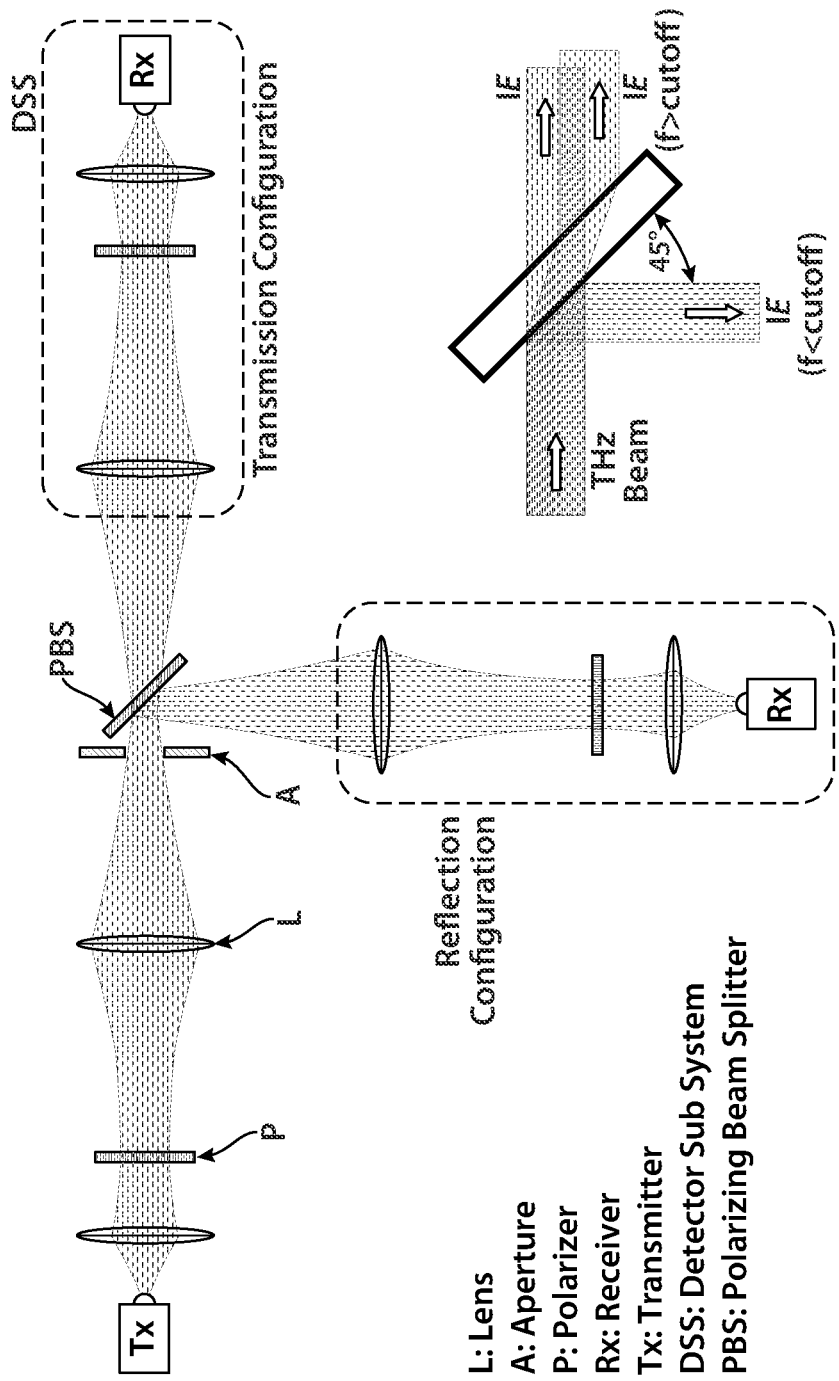
FIG. 2 schematically illustrates the experimental setup, where "Tx" is the abbreviation for transmitter" and "Rx" is the abbreviation for "receiver." The plane of the paper corresponds to the horizontal plane, which is also the plane of the plates. Gray areas represent the propagating beam. The complete detector sub-system (shown within the black dashed enclosure) can be moved intact, from the on-axis position to the 90°-off-axis position to measure either transmission or reflection. All the polyethylene lenses are in confocal configurations to achieve maximum power transfer through the optical system. The inset diagram illustrates the general propagation behavior of the device (not drawn to scale and exaggerated for clarity) for an input beam with an arbitrary linear electric-field polarization direction and a broad spectrum having frequencies extending above and below the $TE_1$-mode's cutoff.

For oblique incidence, the $TE_1$-mode cutoff frequency is given by $c/(2b \cos \alpha)$, where c is the free-space velocity, b is the plate spacing, and α is the incidence angle [15]. For the demonstrated device, the cutoff is at 0.7 THz when the device is illuminated at 45°. Now, if the input electric-field is linearly polarized at an arbitrary angle (between 0° and 90°) to the plates, both the TEM and $TE_1$ modes are excited simultaneously. Then, the portion of the input beam (the perpendicular component) propagating via the TEM mode exits the device on axis, polarized perpendicular to the plates. This TEM-mode contribution is independent of the frequency. In contrast, the portion that could excite the $TE_1$ mode (the parallel component), if below cutoff, is totally reflected at 90° to the input axis, polarized parallel to the plates. By varying the angle of the input polarization, one can control the power division into the two output arms, thereby realizing a versatile PBS. Incidentally, if there is any parallel component at a frequency above the cutoff, this portion would propagate through the device via the $TE_1$ mode and exit the device with a slight lateral shift, polarized parallel to the plates. This general behavior of the device for an incident beam with an arbitrary linear polarization direction having frequencies extending below and above the cutoff is schematically illustrated in the inset of FIG. 2. Since the PBS operation would be hampered by any excitation of the $TE_1$ mode, the upper limit of the operational bandwidth of the PBS is set by the mode's cutoff frequency. Therefore, it follows that the bandwidth can be increased by decreasing the plate spacing and/or increasing the incidence angle.

Experimental Characterization—PBS

A prototype PBS device was experimentally investigated in transmission and reflection configurations using a THz time-domain spectroscopy system, as schematically depicted in FIG. 2. In this spectroscopy system, both the transmitter and receiver modules are fiber coupled to the main controller unit, so as to accommodate the multiple polarization axes and spatial configurations. Throughout the experiment, the device was located between two wire-grid polarizers to purify the input and detected linear polarizations. Via external optics, the input beam was formed to a frequency-independent 1/e Gaussian diameter of approximately 10 mm and fairly well collimated. The same optical arrangement was employed for the output beam to maintain input-output symmetry. While the input optics were fixed in space, the detector sub-system could be moved (intact) from the on-axis position to the 90°-off-axis position to change from a transmission configuration to a reflection configuration. A 16 mm diameter aperture was situated in close proximity to the input transverse-plane of the device. This eliminated any energy "spill-over", providing a true reference signal when the device was not in the beam path, and also served as a marker for the beam axis. In addition to three-axis linear translation, the device mount also included a precision rotation stage to adjust the incidence angle in the horizontal plane, along with precision control of the tilt in two perpendicular vertical planes, allowing complete three-axis rotational positioning.

Figure 3A:
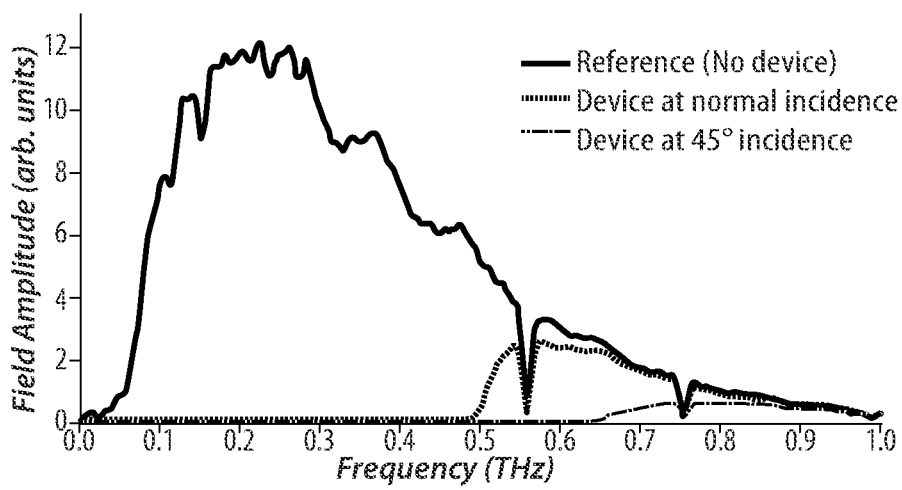
FIGS. 3(A)-3(C) show transmission and reflection spectra. 3(A) Transmission spectra when the input polarization is parallel to the plates. The blue curve is the reference with no device, the green curve is with the device at normal incidence, and the red curve is with the device at 45° incidence. The device spectra correspond to $TE_1$-mode propagation through the device. The sharp dips at 0.56 THz and 0.75 THz are due to water-vapor absorption. 3(B) Reflection spectra when the input polarization is parallel to the plates. The red curve is with the device at 45° incidence and the blue curve is the reference with a polished aluminum mirror replacing the device. 3(C) Transmission spectra when the input polarization is perpendicular to the plates. The blue curve is the reference with no device and the red curve is with the device at 45° incidence. The device spectrum corresponds to TEM-mode propagation through the device. The insets in 3(B) and 3(C) show the corresponding time-domain signals.
Figure 3B:
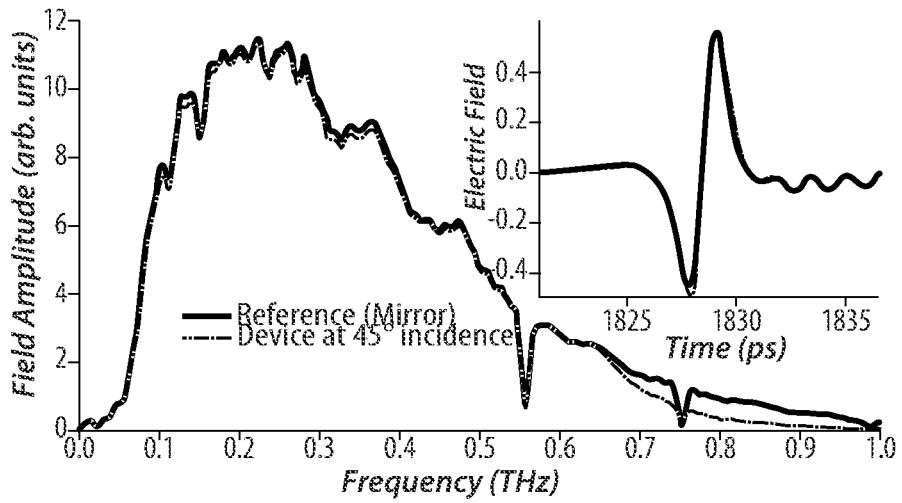
Figure 3C:
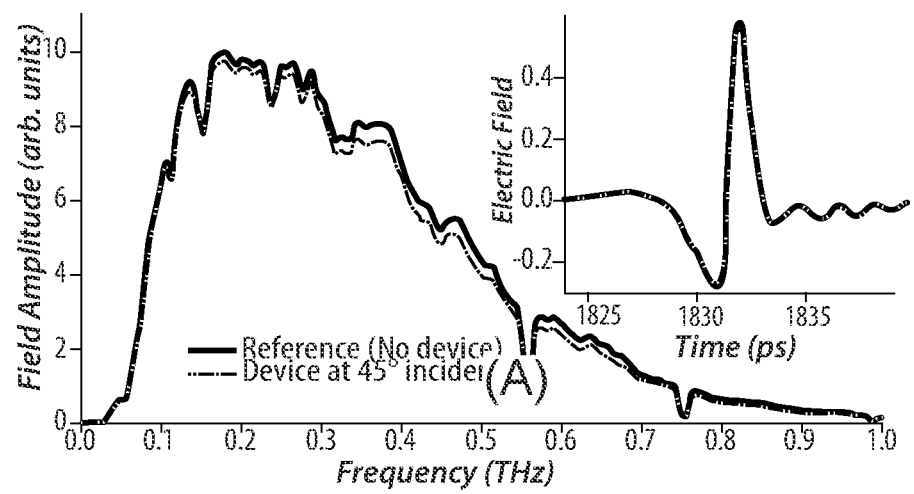

FIGS. 3(A)-3(C) illustrate various measured amplitude spectra that were obtained by Fourier transforming the detected time-domain signals. FIG. 3(A) shows spectra corresponding to the purely $TE_1$-mode behavior of the device in transmission. During this measurement, both the transmitter and receiver polarization axes (along with the input and output polarizer axes) were kept horizontal. Here, the blue curve corresponds to the reference signal when there is no device in the path of the beam. The sharp dips seen at 0.56 THz and 0.75 THz are due to water vapor absorption. The green curve corresponds to the signal when the device is in the path of the beam at normal incidence. This spectrum indicates a cutoff near 0.5 THz, which is expected for a 300 µm plate spacing. The red curve corresponds to the signal when the device is at 45° incidence (the designed operating configuration), and as predicted by theory, the cutoff shifts to a value near 0.7 THz. This $TE_1$-mode diagnostic measurement is indicative of the quality of the device and serves as a demonstration of the operational bandwidth of the PBS.

For the spectra in FIG. 3(B), the polarization axes of the transmitter, receiver, and the polarizers were maintained horizontal as before, but the detector sub-system was moved to measure the reflected signal. The red curve corresponds to the reflected signal when the device is at 45° incidence. The blue curve corresponds to the reference signal when the device is replaced by a polished aluminum mirror. The inset gives the detected time-domain signals, and along with the spectra, they prove the highly efficient and non-dispersive broad-band operation of the device in reflection. The high-frequency attenuation of the device spectrum which appears to build up starting close to 0.7 THz is consistent with the $TE_1$-mode transmission spectrum in FIG. 3(A). Since this attenuation manifests for relatively low amplitude levels of the input spectrum (as evident by the reference), there is only minimal change in the reflected temporal signal.

For the spectra in FIG. 3(C), the measurement configuration was changed back to transmission, and the polarization axes of the transmitter, receiver, and the polarizers, were rotated to be vertical. Therefore, this configuration investigates the purely TEM-mode behavior of the device. The blue curve corresponds to the reference signal when there is no device in the beam path. The red curve corresponds to the signal when the device is at 45° incidence to the input beam. The detected time-domain signals are given in the inset, and as before, along with the amplitude spectra, prove the highly efficient and non-dispersive broad-band operation of the device in transmission. This observation is not surprising since the TEM mode of the PPWG is a very low-loss and dispersion-less propagating mode [13]. However, it should be noted that in order to obtain this efficient propagation it was important for the beam axis to be aligned so as to be parallel to the plate surfaces with high accuracy, and also for the input polarization direction to be exceptionally well perpendicular to the plate surfaces. Deviations from these two conditions would result in additional losses, as the oblique incidence results in a longer interaction path-length, compared to that with normal incidence. It is not only the added ohmic loss that comes into play, but also the relative parallelism of the stack of plates.

Figure 4A:
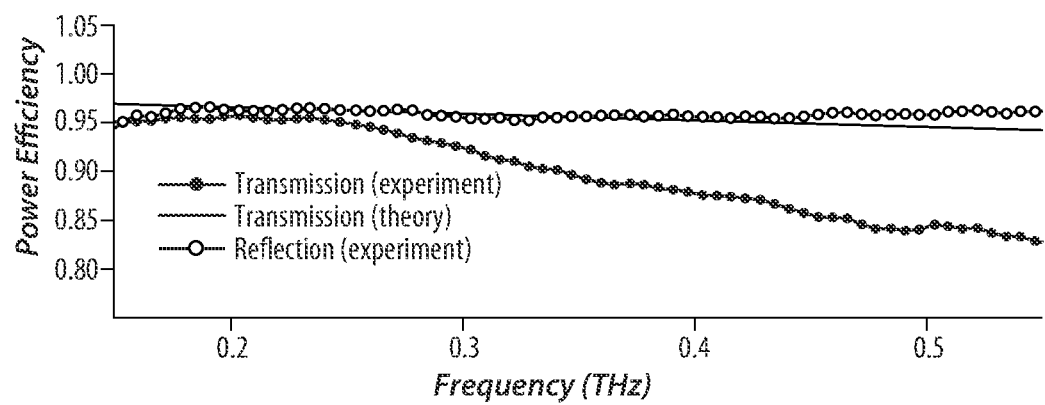
FIGS. 4(A)-4(B) show the power efficiency and extinction ratio. 4(A) Power efficiency for the transmission (blue dots) and reflection (red dots) arms, within the operational bandwidth. The blue solid curve gives the theoretical efficiency for the transmission arm taking into account only the ohmic loss. 4(B) Cross-polarization extinction ratio for the transmission (blue dots) and reflection (red dots) arms, within the operational bandwidth.

Using the spectra in FIGS. 3(B) and (C), one can deduce the power efficiency of the device for the transmission and reflection arms. These efficiency curves are plotted in FIG. 4(A) by the blue dots and red dots for transmission and reflection, respectively, within the operational bandwidth of the PBS. For the reflection arm, the efficiency curve is relatively flat throughout the bandwidth, and indicates a power efficiency of 96% at both 0.2 THz and 0.5 THz, for example. This corresponds to an insertion loss of only 0.18 dB. For the transmission arm, the efficiency is 96% at 0.2 THz, and drops to 84% at 0.5 THz. This corresponds to an insertion loss of 0.76 dB. For comparison, also plotted is the theoretical transmission (blue solid curve) taking into account only the ohmic loss associated with TEM-mode propagation. The discrepancy with the experimental curve (especially as the frequency increases) implies that there are other sources of loss. Part of this extra loss is caused by the non-negligible impedance mismatch at the input and output surfaces of the device, even in the case of TEM-mode propagation [16]. This gives rise to two small reflections from these surfaces, which may also be affected by the finite thickness of the plates. In fact, these reflections played a role in the subsequent measurements that were carried out to estimate the cross-polarization extinction ratios of the PBS.

Figure 4B:
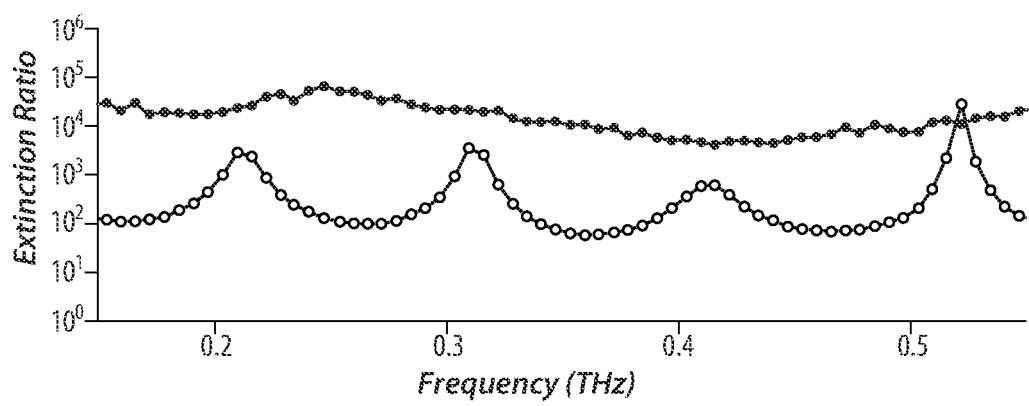

In the next measurement, the input polarization was oriented at 45° to the horizontal plate surfaces, and both the vertical and horizontal components of the output were measured, for both the transmission and reflection configurations separately. Therefore, for the transmission arm, in addition to the major component of the output that is polarized perpendicular to the plates, this also measures the minor component that is polarized parallel to the plates. This minor cross-polarization component is a result of energy leakage due to subtle device imperfections. The squared ratio of these two components gives the extinction ratio, which is plotted by the blue dots in FIG. 4(B). This curve indicates extinction ratios of 42 dB and 39 dB at 0.2 THz and 0.5 THz, respectively. Similarly, for the reflection arm, in addition to the major component polarized parallel to the plates, this measures the minor component polarized perpendicular to the plates. In this case, the cross-polarization component is due to the two TEM-mode reflections at the input and output surfaces, as discussed above. The estimated extinction ratio is plotted by the red dots in FIG. 4(B), where the observed ripple is due to the associated Fabry-Perot effect. This curve indicates extinction ratios of 28 dB and 22 dB at 0.2 THz and 0.5 THz, respectively. These values are not as impressive as for the transmission arm; however, a simple way to improve this extinction would be to add a polarizer to the reflection arm. This polarizer could be an identical artificial-dielectric device as used for the PBS, and would be extremely efficient since the beam would now be at normal incidence.

Experimental Characterization—Isolator

Figure 5:
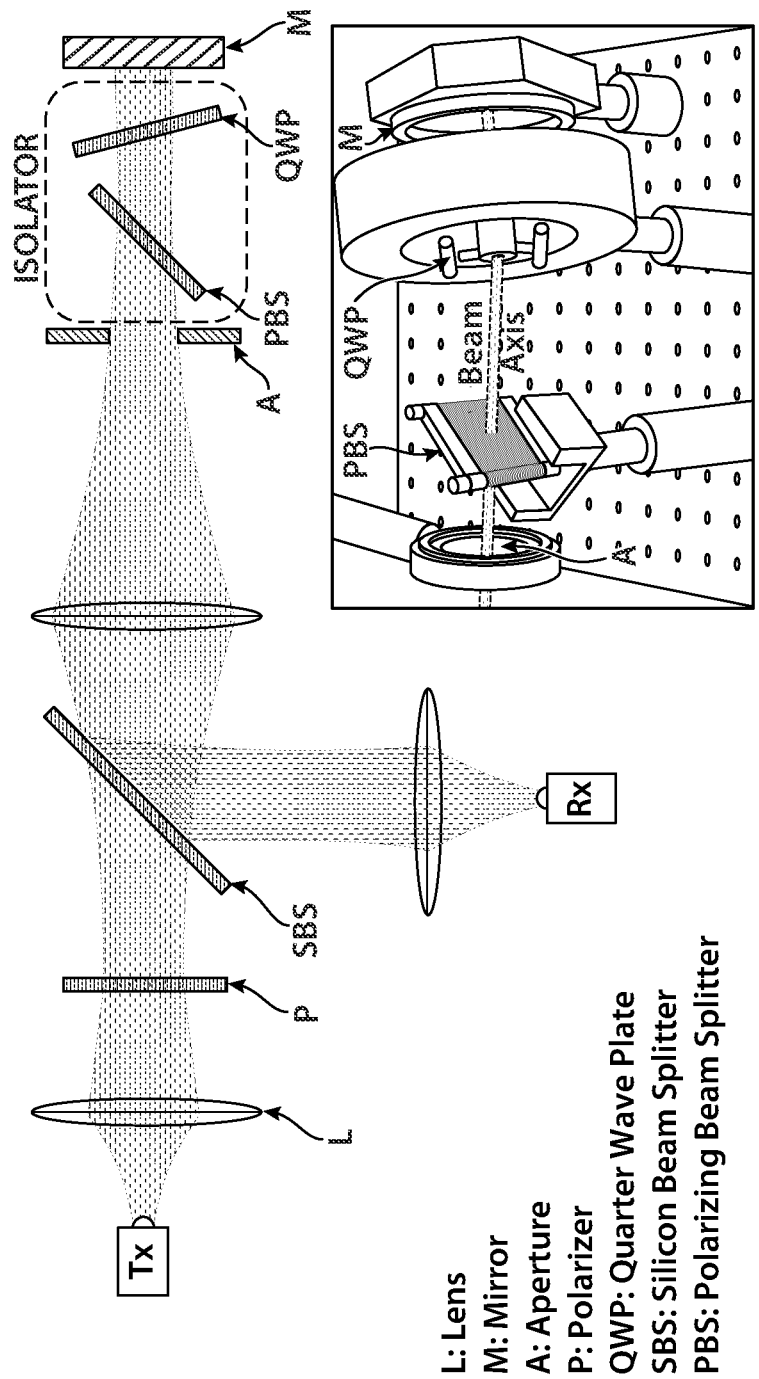
FIG. 5 is a schematic of the experimental setup used to investigate the Isolator. The isolator consists of the PBS combined with a QWP as shown by the red dashed enclosure in the upper right corner of the Figure. A photographic view of the isolator is shown inset. The input polarization is vertical and perpendicular to the plane of the paper. A gold mirror M was used to create the back-reflection, and a silicon beam splitter SBS was used to tap it off to the receiver. The PBS is at 45° incidence, by design, and the QWP is at a 12° incidence to eliminate the back-reflections originating from it.

We constructed an isolator for the THz region using a metal plate artificial dielectric construction, and the isolator performance characteristics were then measured. In optics, the primary purpose of an isolator is to minimize or eliminate feedback (back-reflections), while transmitting sufficient power in the forward direction. Isolators are essential for the stable and reliable operation of lasers, especially high-power ones, in well-aligned complex optical systems, where back-reflections are inevitable. High-contrast isolators are also critical components in full-duplex communication systems [17]. In the THz region, there have been a few experimental studies on isolators, for example, using ferrite materials [see: D. H. Martin and R. J. Wylde, "Wideband circulators for use at frequencies above 100 GHz to beyond 350 GHz," IEEE Trans. Microwave Theory Tech. 57, 99 (2009); and M. Shalaby, M. Peccianti, Y. Ozturk, and R. Morandotti, "A magnetic non-reciprocal isolator for broadband terahertz operation," Nature Commun. 4, 1558 (2013)] or using graphene [M. Tamagnone, C. Moldovan, J.-M. Poumirol, A. B. Kuzmenko, A. M. Ionescu, J. R. Mosig, and J. Perruisseau-Carrier, "Near optimal graphene terahertz non-reciprocal isolator," Nature Commun. 7, 11216 (2016).]. Our THz isolator is designed by combining a polarizing beam splitter (PBS) with a quarter-wave plate (QWP) that is also fabricated utilizing the same artificial-dielectric technology. This isolator design is shown schematically by the dashed-line enclosure in the upper right corner of the schematic diagram given in FIG. 5, and this experimental configuration was used to investigate the isolator behavior. A detailed schematic diagram of the isolator with the respective polarization directions is given in FIG. 6. Here, $\perp$ denotes perpendicular to the plane of the paper (or vertical) and H denotes parallel to the plane of the paper (or horizontal).

The QWP was fabricated using the same 30 μm thick stainless-steel plates as shown, for example in PCT/US17/65524 (claiming priority to 62/432,157 Filed Dec. 9, 2016) which describes a Polarizing beam splitter for THz radiation, but with a plate spacing of 1 mm in a first design (denoted $QWP_1$), and a spacing of 0.8 mm in second design (denoted $QWP_2$). For the proper operation of the QWP, the plane of the plates is oriented at 45° to the input vertical polarization set by the PBS. Then, half of the input energy will propagate via the TEM mode and the other half via the $TE_1$ mode. After propagating through the device at different velocities, these two orthogonal polarization components will acquire a relative phase of 90° at a certain frequency. It can be shown that this occurs at a frequency given by $0.5cd[(1/b)^2+(0.5/d)^2]$, where d is the propagation-path length. Accordingly, since d=2 mm, this should occur at 0.32 THz and 0.49 THz for $QWP_1$ and $QWP_2$, respectively. Now, when there is a back-reflection, due to the "double-pass" through the QWP, the phase difference will become 180°. This will effectively rotate the polarization axis of the resultant reflected beam by 90° [18], rendering it horizontal, and be diverted in the off-axis direction by the PBS, essentially isolating it from the input-beam path.

Figure 6:
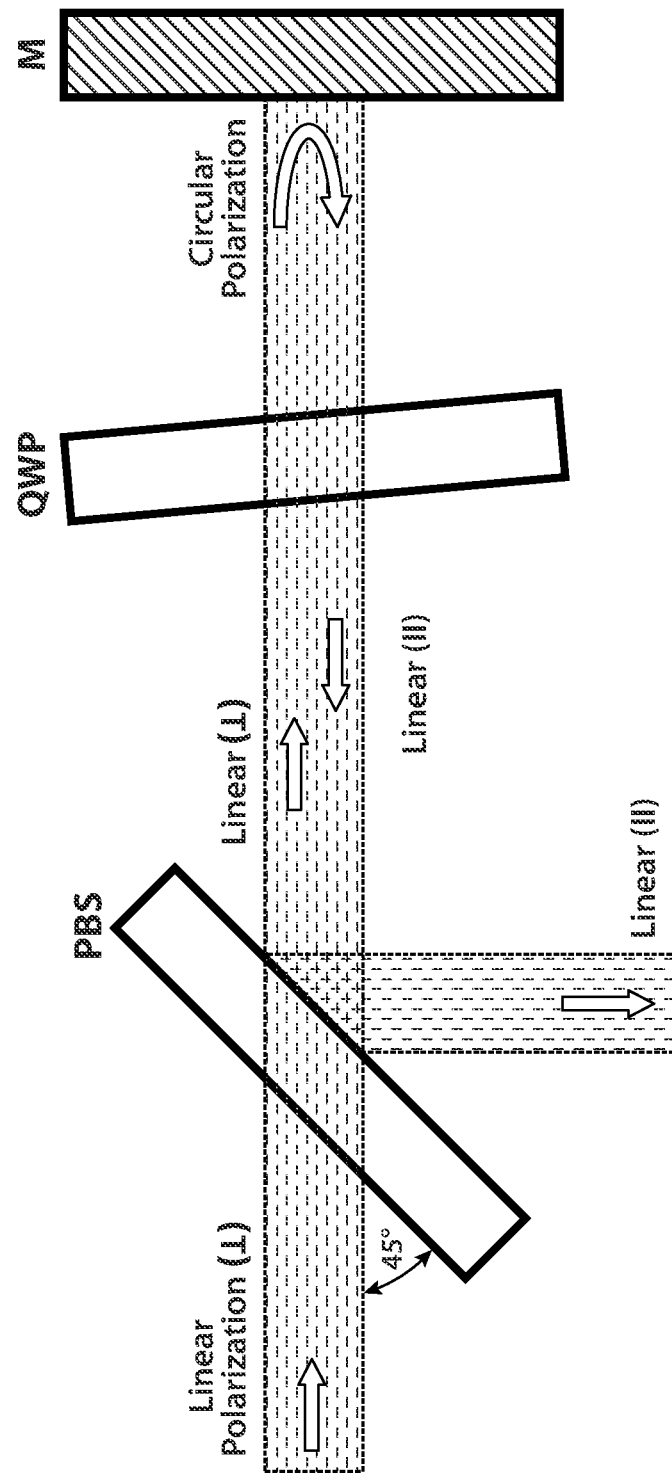
FIG. 6 is a schematic diagram of the isolator with the respective polarization directions given in operation (perpendicular to the plane of the paper or vertical, or parallel to the plane of the paper or horizontal).
Figure 7:
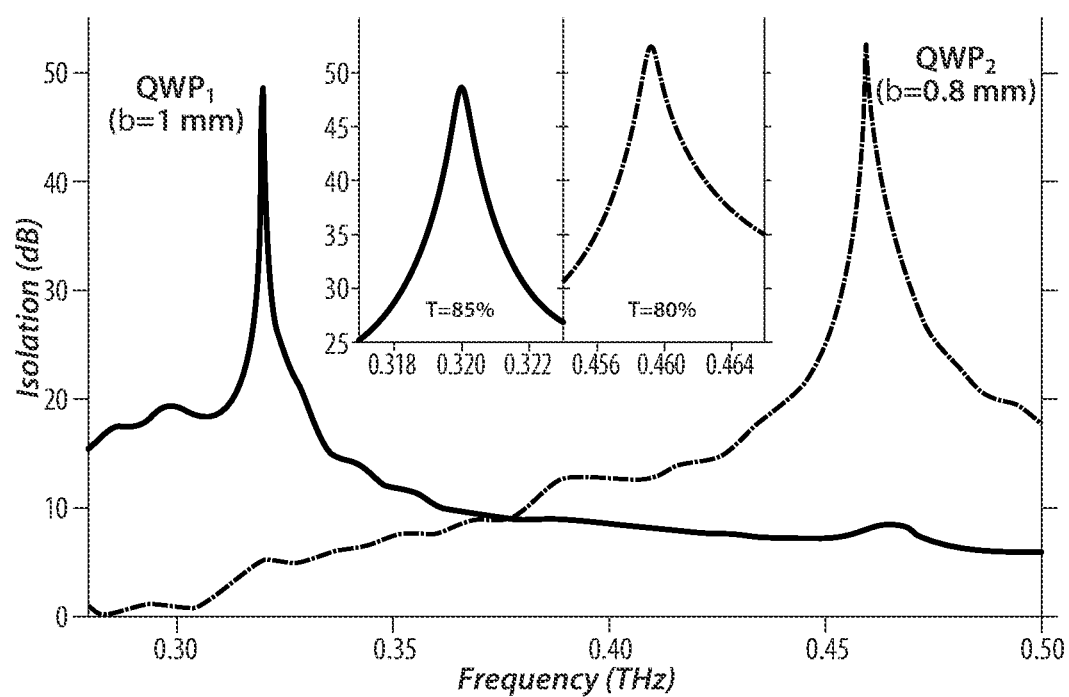
FIG. 7 shows measured isolation curves. Results are shown for two different quarter wave plates, $QWP_1$ (blue curve) and $QWP_2$ (red curve) designs, with close-up views of the peaks shown as insets.

As shown in FIG. 6, a gold mirror M was used to create the back reflection, and it was detected by tapping it off using a silicon beam splitter, with and without the isolator in place. The ratio of these two spectra, after converting to decibels, gives the isolation curves, as plotted in FIG. 7. The QWP was mounted with an azimuthal tilt of 12° to eliminate the back-reflections generated at its surfaces. (This tilt is seen in both the schematic and the photo shown inset in FIG. 6.) For the $QWP_1$ design, the maximum isolation is 48 dB, and this occurs at 0.32 THz, exactly as the theory predicts. For the $QWP_2$ design, the maximum isolation is 52 dB, and this occurs at 0.46 THz, slightly shifted from the theoretical value. This discrepancy may be due to a weaker tightening of the plates assembly, resulting in a slightly larger than expected plate separation. For completeness, the forward power transmission of the isolator was also measured in a different transmission configuration, and it was 85% and 80% (equivalent to an insertion loss of 0.71 dB and 0.97 dB) for the $QWP_1$ and $QWP_2$ designs, respectively, at the peak isolation frequencies. A suitable arrangement that may provide continuous control of the plate spacing would allow dynamic tunability of the isolation-peak, adding versatility to the isolator.

Discussion

In conclusion, we have experimentally demonstrated a highly efficient and versatile PBS for the THz spectral regime based on artificial dielectrics. The device geometry is exceedingly simple compared to all previous PBS attempts for this spectral region. Furthermore, the PBS exhibits insertion losses as low as 0.18 dB and cross-polarization extinction ratios as high as 42 dB. By combining this PBS with a QWP of the same artificial-dielectric technology, we also demonstrate a THz isolator with peak isolations as high as 52 dB. This work opens up a whole new generation of highly effective, highly efficient, easy to fabricate, and inexpensive artificial-dielectric polarimetric devices for the THz region. Furthermore, since the devices are made from stacked metallic plates, as opposed to conventional dielectric materials, they will also uniquely possess extremely high power handling capabilities, limited only by the breakdown of air within the plates.

BIBLIOGRAPHY

[1] X. G. Peralta, E. I. Smirnova, A. K. Azad, H. T. Chen, A. J. Taylor, I. Brener, and J. F. O'Hara, "Metamaterials for THz polarimetric devices," Opt. Exp. 17, 773 (2009).
[2] J. Li, D. Xu, and J. Yao, "Compact terahertz wave polarizing beam splitter," Appl. Opt. 49, 4494 (2010).
[3] C. W. Berry and M. Jarrahi, "Broadband terahertz polarizing beam splitter on a polymer substrate," J. Infrared Milli. Terahz. Waves 33, 127 (2012).
[4] A. I. Hernandez-Serrano and E. Castro-Camus, "Quasi-Wollaston-prism for terahertz frequencies fabricated by 3D printing," J. Infrared Milli. Terahz. Waves (2017). doi:10.1007/s10762-016-0350-1.
[5] W. E. Kock, "Metal-lens antennas," Proc. IRE. 34, 828 (1946).
[6] S. S. D. Jones and J. Brown, "Metallic Delay Lenses," Nature 163, 324 (1949).
[7] R. Mendis, M. Nagai, Y. Wang, N. Karl, and D. M. Mittleman, "Terahertz artificial dielectric lens," Scient. Rep. 6, 23023 (2016).
[8] M. Tamagnone, C. Moldovan, J.-M. Poumirol, A. B. Kuzmenko, A. M. Ionescu, J. R. Mosig, and J. Perruisseau-Carrier, "Near optimal graphene terahertz non-reciprocal isolator," Nature Commun. 7, 11216 (2016).
[9] D. H. Martin and R. J. Wylde, "Wideband circulators for use at frequencies above 100 GHz to beyond 350 GHz," IEEE Trans. Microwave Theory Tech. 57, 99 (2009).
[10] M. Shalaby, M. Peccianti, Y. Ozturk, and R. Morandotti, "A magnetic non-reciprocal isolator for broadband terahertz operation," Nature Commun. 4, 1558 (2013).
[11] S. Takahashi, G. Ratnian M. S. Sherwin, L. C. Brunel, and J. V. Tol, "*Submegahertz linewidth at 240 GHz from an injection-locked free-electron laser*," Appl. Phys. Lett. 91, 174102 (2007).
[12] M. Paquay, J. Marti-Canales, L. Rolo, G. Forma, D. Dubruel, R. Wylde, B. Maffei, D. Doyle, G. Crone, J. Tauber, and R. Hills, "Alignment verification of the PLANCK reflector configuration by RCS measurements at 320 GHz," Proc. of the 38th European Microwave Conference, 765 (2008).

[13] R. Mendis and D. Grischkowsky, "Undistorted guided-wave propagation of subpicosecond terahertz pulses," Opt. Lett. 26, 846 (2001).

[14] R. Mendis and D. M. Mittleman, "Comparison of the lowest-order transverse-electric ($TE_1$) and transverse-magnetic (TEM) modes of the parallel-plate waveguide for terahertz pulse applications," Opt. Exp. 17, 14839 (2009).

[15] R. Mendis and D. M. Mittleman, "A 2-D artificial dielectric with 0≤n<1 for the terahertz region," IEEE Trans. Microw. Theory Tech. 58, 1993 (2010).

[16] M. Mbonye, R. Mendis, and D. M. Mittleman, "Study of the impedance mismatch at the output end of a THz parallel-plate waveguide," Appl. Phys. Lett. 100, 111120 (2012).

[17] N. Reiskarimian and H. Krishnaswamy, "Magnetic-free non-reciprocity based on staggered commutation," Nature Commun. 7, 11217 (2016).

[18] E. Hecht, *Optics*, Addison Wesley, San Francisco, 2002.

The invention claimed is:

1. A system comprising:
a THz device for a radar system;
a send/receive full duplex communication system or some other high power application system that operates with THz-frequency signals;
wherein the THz device includes a first array of spaced-apart conductive plates forming an artificial-dielectric polarizing beam splitter (PBS), and
a second array of spaced-apart conductive plates forming an artificial-dielectric quarter wave plate (QWP) in the path of a beam from the first array, the second array being positioned and oriented to remove any reflections or back-scatter emanating from it.

2. The system of claim 1 wherein the artificial-dielectric quarter wave plate (QWP) is absent any periodic perforations.

3. The system of claim 1 wherein the artificial-dielectric quarter wave plate (QWP) provides a phase delay.

4. The system of claim 1 wherein the artificial-dielectric quarter wave plate (QWP) is fabricated using 30 μm thick stainless-steel plates.

5. The system of claim 1 wherein the polarization beam splitter (PBS) provides polarization selectivity in the beam path, and the quarter wave plate (QWP) provides a phase delay, which in combination with the PBS, is used to reject reflections of the beam.

* * * * *